Figures 1, 2:
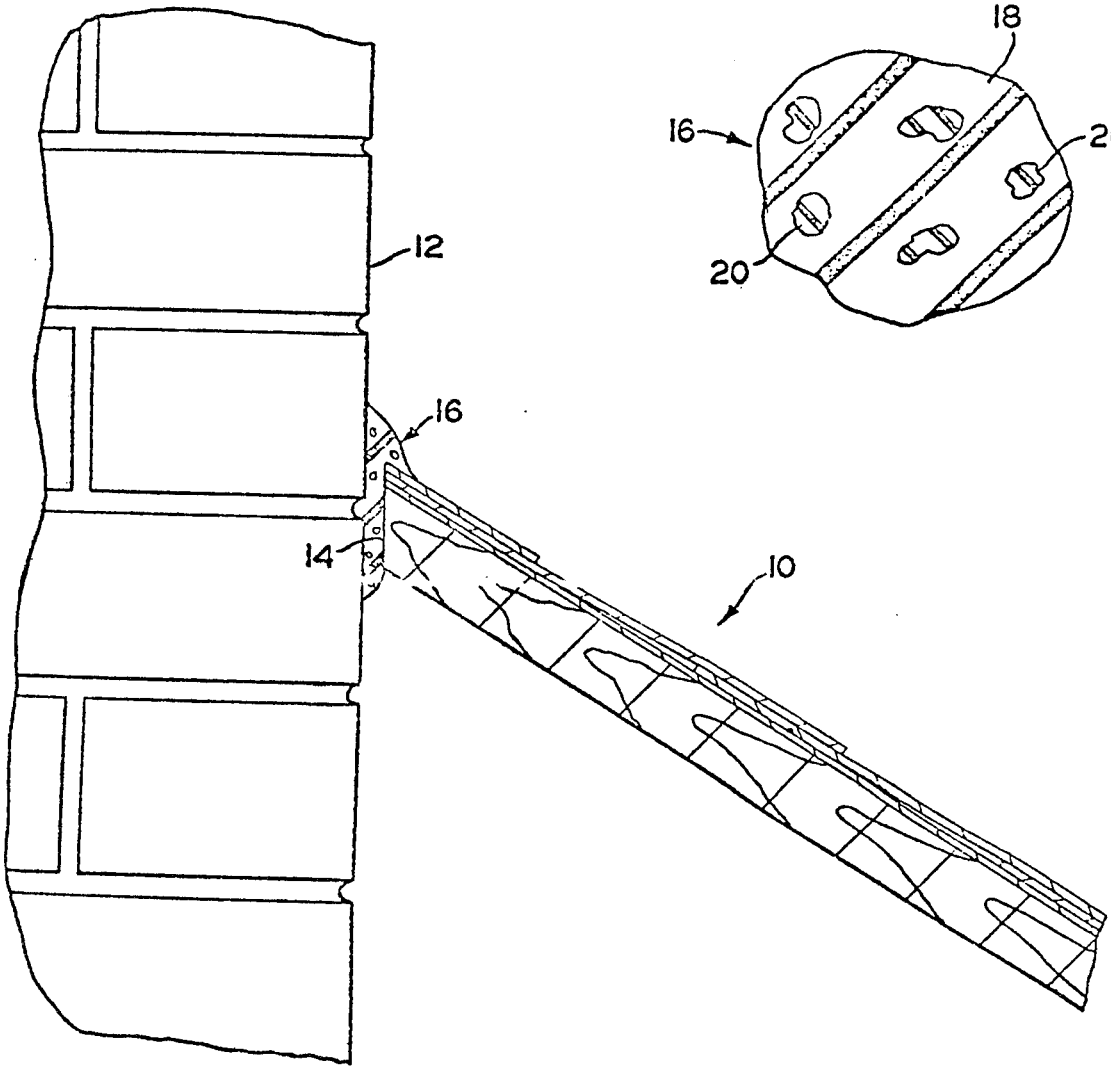

DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED JANUARY 6, 1976

942 O.G. 190

T942,004

SEALANT AND ADHESIVE

Joseph R. Laman, Akron, Ohio, assignor to The Firestone Tire & Rubber Company, Akron, Ohio

Continuation of abandoned application Ser. No. 367,050, June 4, 1973. This application Apr. 18, 1974, Ser. No. 462,147

Int. Cl. C08l *91/06, 95/00*

U.S. Cl. 260—28.5 AS

1 Sheet Drawing. 8 Pages Specification

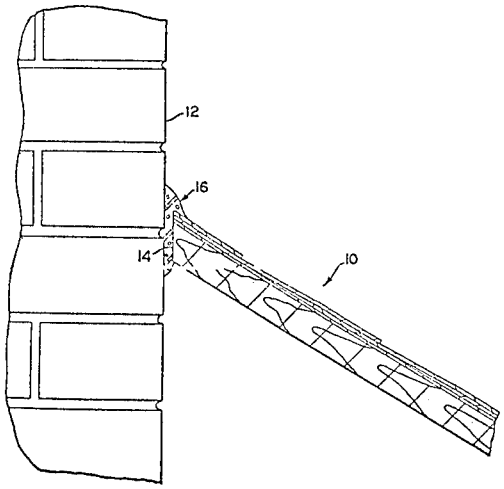

A coating composition containing particles of tire scrap or other scrap rubber in an asphaltic vehicle or a vehicle with a base of a sulfonated petroleum is used in roof valleys, downspouts, eaves, the bottom portions of utility poles, on chimneys and subterranean foundations, flashings at the base of chimneys, etc. and between the elements of a chimney, underground conduit or other structure.

J. R. LAMAN
SEALANT AND ADHESIVE
Original Filed April 18, 1974